United States Patent
Batistic

[19]

[11] Patent Number: 6,052,643
[45] Date of Patent: Apr. 18, 2000

[54] METHOD OF DETECTING CORNERING FOR AN ANTILOCK REGULATION SYSTEM

[75] Inventor: Ivica Batistic, Frankfurt am Main, Germany

[73] Assignee: ITT Manufacturing Enterprises, Inc., Wilmington, Del.

[21] Appl. No.: 08/981,185

[22] PCT Filed: May 18, 1996

[86] PCT No.: PCT/EP96/02623

§ 371 Date: Feb. 26, 1998

§ 102(e) Date: Feb. 26, 1998

[87] PCT Pub. No.: WO97/00798

PCT Pub. Date: Jan. 9, 1997

[30] Foreign Application Priority Data

Jun. 22, 1995 [DE] Germany .......................... 195 22 634

[51] Int. Cl.$^7$ ...................................................... B60T 8/00
[52] U.S. Cl. ............................... 701/72; 701/74; 303/163
[58] Field of Search ..................... 701/72, 74; 303/167, 303/163, 165, 169

[56] References Cited

U.S. PATENT DOCUMENTS

| | | | |
|---|---|---|---|
| 4,844,556 | 7/1989 | Fennel et al. ............................ | 303/140 |
| 5,140,524 | 8/1992 | Matsuda ................................... | 701/72 |
| 5,270,933 | 12/1993 | Fennel et al. ............................ | 701/74 |
| 5,272,636 | 12/1993 | Buschmann et al. .................... | 701/72 |
| 5,302,010 | 4/1994 | Ehmer et al. ........................... | 303/147 |
| 5,669,677 | 9/1997 | Fischer .................................... | 303/147 |

FOREIGN PATENT DOCUMENTS

| | | |
|---|---|---|
| 0293561 | of 0000 | European Pat. Off. . |
| 3413738C2 | of 0000 | Germany . |
| 4141875A1 | of 0000 | Germany . |
| 4230481A1 | of 0000 | Germany . |

*Primary Examiner*—Michael J. Zanelli
*Attorney, Agent, or Firm*—Rader, Fishman & Grauer PLLC

[57] ABSTRACT

For cornering identification in an anti-lock control system and/or traction slip control system, wherein the rotational behavior of the wheels is measured and evaluated to determine a vehicle reference speed, and wherein criteria for cornering identification are derived from the wheel slip, the slip signals of the individual wheels are filtered and the signals sent are compared. Cornering is identified when simultaneously the filtered wheel slip on both front wheels is in excess of a predetermined maximum value and the filtered wheel slip values of one rear wheel exceed and that of the other rear wheel fall below a predetermined value. The threshold values depend on the vehicle reference speed. The direction of cornering is also identified.

7 Claims, 1 Drawing Sheet

METHOD OF DETECTING CORNERING FOR AN ANTILOCK REGULATION SYSTEM

BACKGROUND OF THE INVENTION

The present invention relates to a method of cornering identification provided for use in an anti-lock control system, wherein the rotational behavior of the vehicle wheels is measured by wheel sensors and evaluated to determine a vehicle reference speed which is used as a reference value for ascertaining the wheel slip and for braking pressure modulation, and wherein criteria for cornering identification and the direction of cornering are derived from the wheel slip.

German patent No. 34 13 738 (P 5547) discloses a circuitry for an anti-lock brake system wherein for cornering identification the slip values on the wheels of one vehicle side are added and compared with the slip sum of the wheels of the other vehicle side, and the cornering identification signal is produced as soon as the difference of the slip sums of both vehicle sides exceeds a predetermined limit value. In the brake system concerned, the braking pressure variation in individual braking pressure control channels is combined according to predefined selection criteria, such as Aselect-low@ or Aselect-high@. The selection criteria and predetermined limit values which also influence the control are changed when cornering is detected.

In an anti-lock system described in German patent application No. 21 19 590, a cornering identification signal is produced by means of a transverse acceleration measuring device, for example, a mercury switch.

Further, German patent application No. 19 65 391 discloses an anti-lock control system which determines the slip values of the individual wheels and takes them into account for the braking pressure control.

Difficulties are involved in identifying cornering and adapting anti-lock control to the different conditions prevailing during straight travel and cornering. If the control data, as is conventional practice with an anti-lock system, are produced exclusively or mainly by means of wheel sensors, the wheel slip caused by cornering must be distinguished from slip which is caused by locking tendencies or induced by the control. Principally, it would be desired to take an information about straight travel or cornering into account for the control. However, the use of a steering angle sensor, transverse acceleration sensor, or the like, which could supply such an information, is generally rejected for cost reasons. In more complex control systems, for example, in driving stability control systems (DSC, ASMS), however, it is absolutely imperative to bear the increased expenditure for sensors of the above-mentioned type.

An object of the present invention is to achieve an exact cornering identification in a simple fashion and without additional sensors, i.e., only on the basis of the data supplied by the wheel sensors.

SUMMARY OF THE INVENTION

It has been found that this object can be achieved by the method described in accordance with the present invention, the special features of which involve that the wheel slip signals are filtered and the filtered signals are compared and that Acornering@ is identified when simultaneously the filtered wheel slip on the two front wheels is in excess of a predetermined front-wheel-related maximum slip value that is responsive to the instantaneous vehicle speed or vehicle reference speed, and the filtered wheel slip of one rear wheel is above and the filtered wheel slip of the other rear wheel is below a predetermined rear-wheel-related maximum slip value that is responsive to the vehicle reference speed or below a predetermined minimum slip value responsive to the vehicle (reference) speed, and the rear wheel having the lower slip value or the higher speed is assessed as the curve-outward rear wheel to determine the direction of cornering.

When conventional circuitries, such as those of microcomputers and like elements, and circuits or program steps having a low-pass filter characteristic are used, favorably, the filtered wheel slip signal is produced according to the relation $$fws_{neu} = fws_{alt} + (fws_{alt} - fws_{neu})/T$$

and >$fws_{neu}$= refers to the filtered wheel slip which was the last one ascertained in the working cycle and >$fws_{alt}$= refers to the previously ascertained filtered wheel slip. >T= implies a predetermined time constant which ranges in the order between 30 and 200 msec, more particularly between 50 and 100 msec.

It is important to reliably distinguish between straight travel and cornering especially in relatively inexpensive anti-lock systems having only two hydraulically independent control channels or including the so-called 2½ channel configuration in which the braking pressure control in each of the two control channels is extended by an additional two-way/two-position directional control valve. It is particularly important in such 2-channel systems or 2½ channel systems to adapt the control to these special conditions during cornering identification.

The present invention utilizes the implication that the front wheels have a slip responsive to the slip angle during cornering. This slip increases with an increasing slip angle. The curve-inward rear wheel has a smaller curve radius than the curve-outward rear wheel in a curve. Consequently, the curve-outward rear wheel is the wheel with the highest rotational speed and largely determines the vehicle reference speed. The closer the vehicle speed approaches the curve limit speed, the more distinct and unambiguous this tendency becomes. This typical behavior is used for cornering identification according to the present invention.

In another preferred aspect of the method of the present invention, a value in the order between 3 and 10% of the vehicle (reference) speed is predetermined for the front-wheel-related maximum slip value, a value in the order between 2 and 5% of the vehicle (reference) speed is predetermined for the rear-wheel-related maximum slip value, and a value in the order between 0.5 and 2% of the vehicle (reference) speed is predetermined for the rear-wheel-related minimum slip value.

Further features, advantages and possible applications can be seen in the following description, making reference to the accompanying illustration of an embodiment of the present invention.

BRIEF DESCRIPTION OF THE DRAWING

The illustration is a schematic block diagram of a circuitry for implementing the method of the present invention.

DETAILED DESCRIPTION OF THE DRAWING

Figure 1:
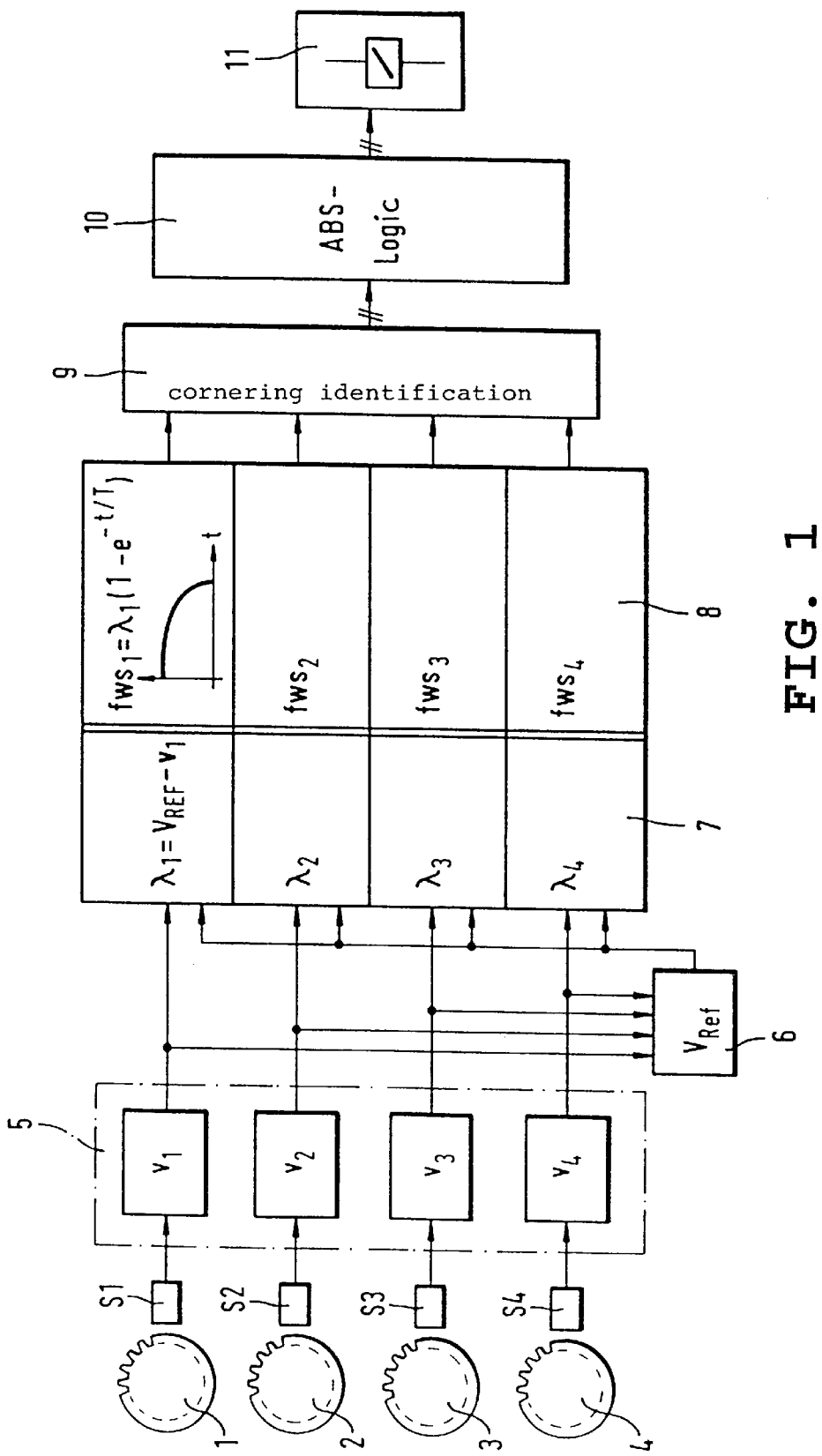

The circuitry shown is included in an anti-lock system. Signals representative of the rotational behavior of the individual vehicle wheels are produced by means of wheel sensors S1 to S4. Generally, inductive transducers or active wheel sensors are used to date. The represented toothed discs 1 to 4, for example, are appropriate as signal generators. Toothed discs 1 to 4 rotate along with the vehicle wheels and cause an alternating signal in the wheel sensors S1 to S4 which corresponds to the rotation and the number of teeth.

A conditioned speed signal $v_1$ to $v_4$ which corresponds to the wheel speed is produced from the sensor signals in a signal-conditioning circuit 5.

A vehicle reference speed $V_{Ref}$ is produced in a circuit 6 by logically combining the speed signals $v_1$ to $v_4$. Among others, the vehicle reference speed is used as a reference value to determine the wheel slip $\lambda_1$ to $\lambda_4$ of the individual vehicle wheels. To this end, the difference between the vehicle reference speed $v_{Ref}$ and the respective wheel speed $v_i$ is produced according to the relation $$\lambda_i = V_{Ref} - v_i$$

(i=1 ... 4).

The individual circuits to produce the wheel slip signals $8_1$ to $8_4$ are combined and represented in a circuit block 7, as shown.

The wheel slip signals $8_1$ to $8_4$ are processed in a circuit 8 which is a filter with a low-pass characteristic. Generally, the relation $$fws_i = \lambda_i(1 - e^{-t/T})$$

applies to a wheel i or, when a microcomputer and digital filtering technology is used, the relation $$fws_{neu} = fws_{alt} + (fws_{alt} - fws_{neu})/T$$

applies individually to each wheel. >fws= herein designates the filtered wheel slip signal. >T= is the filter time constant which may range between 30 and 200 msec, for example. In one embodiment, >T==70 msec.

The filtered wheel slip values fws are then analyzed in a cornering identification circuit 9. ACornering@ exists when the following conditions are simultaneously satisfied:

$$(fws_1 \ \& \ fws_2) > S_{max \ VA}$$
$$fws_{3(4)} > S_{max \ HA}$$
$$fws_{4(3)} < S_{min \ HA}$$

Indices 1 and 2 refer to the front wheels, and indices 3 and 4 refer to the rear wheels. Comparison of the rear-wheel slip values indicates which rear wheel (the rear wheel having the higher slip value) is the curve-outward wheel.

The slip thresholds $S_{max \ VA}$, $S_{max \ HA}$, $S_{min \ HA}$ depend on the vehicle (reference) speed. In one embodiment of the present invention, the slip thresholds are defined as follows:

$$S_{max \ VA} = (3\% \ ... \ 10\%) V_{Ref}; \text{ more particularly } 5\% \ V_{Ref}$$
$$S_{max \ HA} = (2\% \ ... \ 5\%) V_{Ref}; \text{ more particularly } 3\% \ V_{Ref}$$
$$S_{min \ HA} = (0.5\% \ ... \ 2\%) V_{ref}; \text{ more particularly } 1\% \ V_{Ref}.$$

A simultaneous exceeding of the above-mentioned three threshold values permits reliably identifying cornering, and the direction of cornering can be identified by comparison of the rear-wheel slip values.

Thus, according to the present invention, the described logic combination and evaluation of wheel rotational speeds or wheel slip data of all vehicle wheels permits reliably and exactly distinguishing between straight travel and cornering. The control may then be improved significantly on the basis of this information.

The above-mentioned dependence of the slip thresholds on the vehicle (reference) speed applies preferably only in a defined range or only above a minimum vehicle (reference) speed. If necessary, it is possible to change the slip percent values as a function of the vehicle speed.

In the embodiment shown, the output signals of the cornering identification circuit 9 are sent to an ABS control logic 10 in which the proper determination or calculation of braking pressure modulation signals is effected as a function of the rotational behavior of the individual vehicle wheels. In addition, the data supplied by the curve identification circuit are taken into account for anti-lock control operations in the present case.

The output signals of the control logic are sent to a valve block 11 which represents the various braking pressure control valves or actuators of an anti-lock control system. In an anti-lock hydraulic brake system, for example, valve pairs (inlet and outlet valves) are associated with the individual wheel brakes for anti-lock control.

The method for cornering identification and the described circuitry according to the present invention, which are preferably intended for use in an anti-lock control system, are also appropriate for traction slip control systems and other control systems where the objective is to distinguish between straight travel and cornering.

What is claimed is:

1. A method of cornering identification for an anti-lock control system in a vehicle with two front wheels and two rear wheels, wherein the rotational behavior of the vehicle wheels is measured by wheel sensors and evaluated to determine a vehicle reference speed which is used as a reference value for ascertaining wheel slip signals and for breaking pressure modulation, and wherein criteria for cornering identification and the direction of cornering are derived from the wheel slip signals, wherein the wheel slip signals are filtered and the filtered signals are compared, and wherein "cornering" is identified when simultaneously the filtered wheel slip signals on the two front wheels are in excess of a predetermined front-wheel-related maximum slip value that is responsive to at least one of an instantaneous vehicle speed and vehicle reference speed, and the filtered wheel slip signal of one rear wheel is above a predetermined rear-wheel-related maximum slip value, and the filtered wheel slip of the other rear wheel is below a predetermined rear-wheel-related slip value that is responsive to the vehicle reference speed, and the rear wheel, having at least one of the lower slip value and the higher speed, is assessed as curve-outward rear wheel to determine the direction of cornering.

2. The method of claim 1, wherein "cornering" is identified when the other rear wheel has a wheel slip signal below the predetermined rear-wheel-related maximum slip value.

3. The method of claim 1, wherein "cornering" is identified when the other rear wheel has a wheel slip signal below a predetermined rear-wheel-related minimum slip value.

4. The method of claim 3, wherein a value in the order between 0.5 and 2% of the vehicle reference speed is predetermined for the rear-wheel-related minimum slip value.

5. The method of claim 1, wherein a value in the order between 3 and 10% of the vehicle reference speed is predetermined for the front-wheel-related maximum slip value, and a value in the order between 2 and 5% of the vehicle reference speed is predetermined for the rear-wheel-related maximum slip value.

6. The method of claim 1, wherein at least one programmed circuit and filter is provided having a low-pass filter characteristic and the filtered wheel slip signals are produced according to the relation $$fws_{neu} = fws_{alt} + (fws_{alt} - fws_{neu})/T,$$

wherein "$fws_{neu}$" refers to the filtered wheel slip signal which was the last one ascertained in the working cycle, "$fws_{alt}$" refers to the previously ascertained filtered wheel slip signal, and "T" implies a predetermined time constant which ranges in the order between 30 and 200 msec.

7. The method of claim 6, wherein the predetermined time constant ranges in the order between 50 and 100 msec.

* * * * *